United States Patent
Marchionni et al.

(10) Patent No.: US 6,403,539 B1
(45) Date of Patent: Jun. 11, 2002

(54) PERFLUOROPOLYETHER LUBRICANT CONTAINING SULPHONYLFLUORIDE GROUPS

(75) Inventors: Giuseppe Marchionni; Ugo De Patto, both of Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/631,880

(22) Filed: Aug. 2, 2000

(30) Foreign Application Priority Data

Aug. 4, 1999 (IT) .......................................... MI99A1756

(51) Int. Cl.$^7$ ........................................... C10M 107/38
(52) U.S. Cl. ........................ 508/406; 508/388; 508/568
(58) Field of Search ................................ 508/568, 388, 508/406

(56) References Cited

U.S. PATENT DOCUMENTS

| | | | | |
|---|---|---|---|---|
| 3,282,875 A | * | 11/1966 | Connelly et al. | 260/29.6 |
| 4,384,128 A | | 5/1983 | Krespan et al. | 549/550 |
| 4,610,829 A | * | 9/1986 | Lalu et al. | 260/543 R |
| 4,940,525 A | | 7/1990 | Ezzell et al. | 204/252 |
| 5,142,842 A | | 9/1992 | Schirmer | 53/427 |
| 5,241,110 A | * | 8/1993 | Nararrini et al. | 562/111 |
| 5,258,110 A | | 11/1993 | Sianesi et al. | 204/157.92 |
| 5,374,770 A | * | 12/1994 | Nararrini et al. | 562/111 |
| 5,488,181 A | | 1/1996 | Marchionni et al. | 568/615 |
| 5,872,157 A | | 2/1999 | DeSimone et al. | 522/5 |
| 6,184,187 B1 | * | 2/2001 | Howell et al. | 508/427 |

FOREIGN PATENT DOCUMENTS

| | | |
|---|---|---|
| EP | 0 244 839 A2 | 11/1987 |
| EP | 0 289 869 | 11/1988 |
| EP | 0 393 700 A1 | 10/1990 |
| EP | 0 654 493 A1 | 5/1995 |
| EP | 0 677 504 A1 | 10/1995 |
| EP | 0 831 110 A1 | 3/1998 |
| WO | WO 98/18627 | 5/1998 |

* cited by examiner

*Primary Examiner*—Ellen M. McAvoy
(74) *Attorney, Agent, or Firm*—Arent Fox Kintner Plotkin & Kahn

(57) ABSTRACT

Perfluoropolyether lubricants containing sulphonylfluoride groups pending along the perfluoropolyether chain and having the following formula:

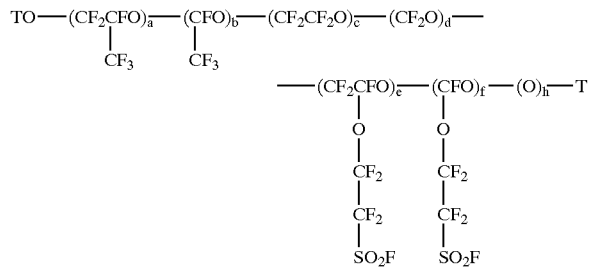

wherein:

T are end groups selected from —$CF_2X$ (X=F,$CF_3$Cl), —$C_3F_7$, —COF, —CF($CF_3$)COF, —$CF_2$COF, —$CF_2$COCF$_3$;

d,e,f,h are integers; a,b,c can be zero or integers; said units are statistically distributed along the chain, being a+b+c+d+e+f+h such that the number average molecular weight ranges from 500 to $5 \times 10^5$, preferably from 1,000 to 50,000.

19 Claims, No Drawings

US 6,403,539 B1

PERFLUOROPOLYETHER LUBRICANT CONTAINING SULPHONYLFLUORIDE GROUPS

The present invention relates to perfluoropolyether lubricants having pendent sulphonylfluoride groups distributed from the polymeric backbone.

Specifically the invention relates to lubricants having an improved glass transition temperature (Tg) (up to –130° C.) combined with a high thermo-oxidative stability and obtainable by a process having improved Productivity with respect to the known lubricant process.

More specifically, the invention relates to lubricants based on perfluoropolyethers (PFPE) which, compared with the known commercial products in the lubricant field, show the following combination of properties:

Tg in the range from –130° to –60° C.;

Tg adjustable in function of the monomeric units present in the polymeric backbone, adjustable also when the molecular weight is the same;

high thermal stability also in oxidative conditions;

obtainable by a process in high productivity.

The preparation of perfluoropolyethers formed of oxyperfluoroalkylene sequences containing peroxidic groups in various amounts depending on the reaction conditions, is known in the prior art. These compounds can be obtained by oxidation of perfluoroolefins at low temperature (between –100° C. and –30° C.) with oxygen in the presence of UV radiations, or alternatively, by oxidation of perfluoroolefins at low temperature with oxygen in the presence of suitable polymerization initiators, for example $F_2$, $CF_3OF$. See EP 393,700 and EP 654,493. The elimination of the peroxidic groups from the perfluoropolyether chain can be carried out both by thermal and photochemical route. In these patents perfluoropolyethers having pendent functional groups from the polymeric backbone are not described.

Perfluoropolyethers having pendent functional groups from the polymeric backbone are described in EP 244,839. It is described the photooxidation of perfluorobutadiene, optionally with a perfluorinated olefin at low temperature in the presence of oxygen and subsequent photochemical decomposition of the peroxidic groups, allowing to obtain perfluoropolyethers formed by a backbone of oxyperfluoroalkylene units with pendent fluorinated epoxide groups. By converting the fluorinated epoxide groups polyfunctional derivatives having functional groups such as —COOH, —COOR, —CONHR (R=H or $C_1$–$C_{12}$ alkyl), —CN, —CH$_2$OH, —CH$_2$NH$_2$, etc. can be obtained which can be used for various applications depending on the functional groups pending along the polymeric backbone. The drawback of this patent is that the functional derivatives are obtained by complex reactions which require intermediate steps.

In U.S. Pat. No. 4,384,128 copolymers obtained from hexafluoropropene oxide (HFPO) and from perfluoroglycidyl-ethers epoxides, according to the following polymerization reaction, are described:

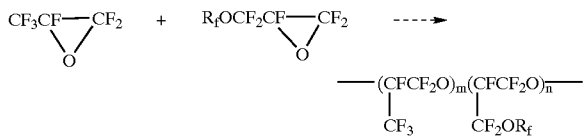

wherein: $R_f$ is selected from —CF$_2$CF$_2$SO$_2$F, —(CF$_2$)$_4$COF, —CF$_2$CF$_2$CN, —C$_6$F$_5$, —CF$_2$CF(CF$_3$)OCF$_2$CN, —CF$_2$CF$_2$OC$_6$F$_5$.

The polymerization carried out in the presence of a suitable solvent and anionic initiators at a temperature in the range –35° C. and 0° C. allows to obtain non peroxidic perfluoropolyethers. Subsequently, the copolymers containing the functional groups —COF, —COOH, —SO$_2$F, reacted with suitable reactants can be converted into functionalized polymers containing the —COCl, —CONH$_2$, —SO$_2$OH, —SO$_2$OM', —CO$_2$M', —CN groups, wherein M' is an alkaline metal or an ammonium group, which are endowed with hydrophilicity and have ionic exchange properties. The patent aim is the curing of these polymers in order to obtain moldable articles.

The use of PFPEs as lubricants is furthermore known, for example FOMBLIN® Y commercialized by AUSIMONT, having the following structure:

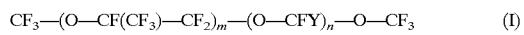

wherein Y=F, CF$_3$ and the m/n ratio ranges from 5 to 40.

The Tg values obtained with these PFPEs are of the order –65° C.–85° C. and depends on the PFPE number average molecular weight. The molecular weight being fixed, the Tg has a well determined value. Therefore the only way to furtherly decrease the Tg is to reduce the molecular weight. This implies products having high vapour pressure. They have the drawback to require frequent lubricant re-fillings since there are substantial losses of product in the use at high temperatures. This phenomenon is even more evident in specific applications, for example in aerospace field, wherein the lubricant is used in temperature cycles varying from very high temperature values to very low temperature values.

To overcome this drawback, an alternative is the use of FOMBLIN® Z commercialized by AUSIMONT, having the following structure:

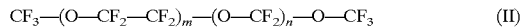

wherein the m/n ratio ranges from 0.3 to 5.

The Tg obtained with these PFPEs are of the order of –130° C. and –120° C. and depend on the PFPE number average molecular weight and on the m/n ratio.

The perfluoropolyether FOMBLIN® Z have however the drawback to be obtained with a process having low productivity. In fact for their obtainment it is necessary to polymerize the tetrafluoroethylene monomer in the presence of a solvent. This involves a high production cost of FOMBLIN® Z compared with that of FOMBLIN® Y. Furthermore FOMBLIN® Z compared with FOMBLIN® Y shows a reduced thermal stability in oxidative conditions.

The need was felt to have available a perfluoropolyether lubricant overcoming the drawbacks of commercial products.

The Applicant has surprisingly and unexpectedly found a class of lubricants which solves the above technical problem showing the following combination of properties:

Tg in the range –130° and –60° C.;

Tg adjustable in function of the monomeric units present in the polymeric backbone, adjustable also when the molecular weight is the same;

high thermal stability also in oxidative conditions;

obtainable by a process in high productivity.

An object of the invention are perfluoropolyether lubricants containing sequences of oxyperfluoroalkylene units, characterized by the presence of sulphonylfluoride groups pending from the polymeric backbone and having the following formula (III):

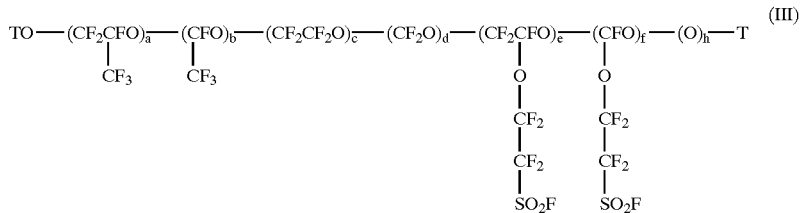

(III)

wherein:

T are end groups selected from —CF$_2$X (X=F,CF$_3$,Cl), —C$_3$F$_7$, —COF, —CF(CF$_3$)COF, —CF$_2$COF, —CF$_2$COCF$_3$;

d,e,f,h are integers; a,b,c can be zero or integers; said units are statistically distributed along the chain, being a+b+c+d+e+f+h such that the number average molecular weight ranges from 500 to 5×10$^5$, preferably from 1,000 to 50,000.

Generally the units d,e,f,h are present in most polymeric chains; of course some chains can contain only some of these units.

The perfluoropolyether lubricants of the invention are homopolymers of the perfluoro 3-oxa 5-fluorosulphonyl 1-pentene (CF$_2$=CFOCF$_2$CF$_2$SO$_2$F) or copolymers of this sulphonic monomer with perfluoroolefins.

The perfluoroolefins are preferably tetrafluoroethylene and/or perfluoropropene.

Other optional units which can be present are those derived from comonomers, such as for example perfluoroalkylvinylethers CF$_2$=CF$_2$OR$_f$, wherein R$_f$ is a perfluoroalkyl group —CF$_3$, —C$_2$F$_5$, —C$_3$F$_7$, or perfluorinated conjugated dienes, in particular perfluorobutadiene.

The perfluoropolyether lubricants of the present invention can therefore contain perfluorinated units of the type —(CF$_2$CF(CF$_3$)O)—, —(CF(CF$_3$)O)—, —(CF$_2$CF$_2$O)—, —(CF$_2$O)—, —(CF$_2$CF(OCF$_2$CF$_2$SO$_2$F)O)—, —(CF(OCF$_2$CF$_2$SO$_2$F)O)— statistically distributed along the chain and in an amount variable depending on the operating conditions.

The sulphonic functional perfluoropolyethers of the invention contain in variable amounts, depending on the operating polymerization process conditions, the above units. Besides the sulphonic pendent group is linked to the backbone through an oxygen atom (C—O—C bond). According to a not binding theory, the Applicant considers that these structural characteristics bring a greater flexibility degree and therefore a greater conformational freedom to the chain and to the pendent groups having the reactive function, with consequent decrease of the invention PFPE Tg with respect to the PFPEs of the prior art, the molecular weight being equal.

The products of the present invention, due to their particular structure and to the possibility to change the ratios of the units present in the structure depending on the operating conditions, show a glass transition temperature T$_g$ in the range −130° C. and −60° C. and have a good oxidative stability also at high temperatures wherefore they can be used in a wide temperature range in various applications.

The lubricants of the invention in comparison with commercial lubricants FOMBLIN® Y show a lower Tg, the molecular weight being equal, since it is possible to change their structure without the need to lower the molecular weight, which would involve an increase of the vapour pressure with the above drawbacks.

Besides the lubricants of the invention even though they maintain a high thermo-oxidative stability, show Tg values down to −130° C. which in the prior art are obtainable only with FOMBLIN® Z, which have however the above drawbacks.

The Applicant has surprisingly found that it is possible to furtherly lower the Tg until reaching also the values of FOMBLIN® Z when the —CF$_2$CF$_2$O— units having two carbon atoms are also present. Unexpectedly it has been found that the units with the SO$_2$F group even though they have pending groups as the —CF$_2$CF(CF$_3$)O— units having three carbon atoms of FOMBLIN® Y, do not cause a Tg increase.

As known, the thermo-oxidative stability of FOMBLIN® Z is lower than that of FOMBLIN® Y. The thermal stability of the lubricants of the invention also when they contain the —C—CF$_2$CF$_2$O— units having two carbon atoms, characteristic units of FOMBLIN® Z, is very high and substantially comparable with that of FOMBLIN® Y.

When tetrafluoroethylene (CF$_2$=CF$_2$) is used as comonomer of perfluoro 3-oxa 5-fluorosulphonyl 1-pentene (CF$_2$=CFOCF$_2$CF$_2$SO$_2$F), the perfluoropolyether lubricant of the present invention has the following structure:

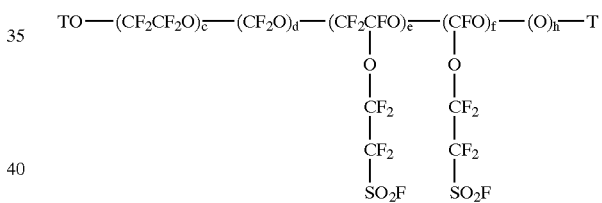

wherein:

T are end groups selected from —CF$_2$X (X=F,CF$_3$,Cl), —COF, —CF$_2$COF;

c,d,e,f,h have the above defined meaning with the proviso that c cannot be equal to 0.

When hexafluoropropene (CF$_2$=CF—CF$_3$) is used as comonomer, a perfluoropolyether of the following structure is obtained:

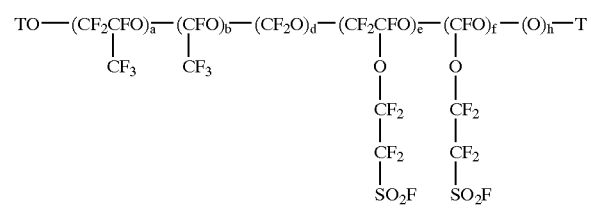

wherein:

T are end groups selected from —CF$_2$X (X=F,CF$_3$), —C$_3$F$_7$, —COF, —CF$_2$COF, —CF(CF$_3$)COF, —CF$_2$COCF$_3$;

a,b,d,e,f,h have the above defined meaning with the proviso that a,b cannot be 0.

When $CF_2=CFOCF_2CF_2SO_2$ is copolymerized with a mixture of tetrafluoroethylene and perfluoropropene, the products of general formula (III) are obtained, with the proviso that a,b,c are different from zero.

When $CF_2=CFOCF_2CF_2SO_2F$ is homopolymerized, a PFPE of the following structure is obtained:

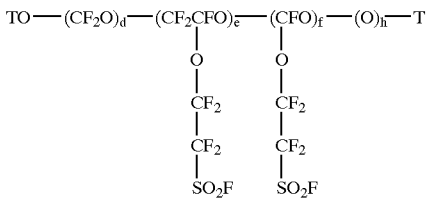

wherein:

T are end groups selected from $—CF_2X$ (X=F,CF$_3$,Cl), $—COF$, $—CF_2COF$, $—CF_2CF_2SO_2F$;

d,e,f,h have the above defined meaning.

The homopolymers can have a very high number of pendent sulphonic groups, not obtainable with any other synthesis method known so far.

The perfluoropolyethers of the invention can be obtained starting from the above mentioned monomers by a photo-oxidation process, i.e. a polymerization process in the presence of oxygen which utilizes the action of ultraviolet radiations; or by an alternative process which excludes the use of ultraviolet radiations and uses compounds having the function of polymerization initiators, or by a mixed process which uses UV radiations and polymerization initiators as defined hereunder.

In the former case the perfluoro 3-oxa 5-fluorosulphonyl 1-pentene ($CF_2=CFOCF_2CF_2SO_2F$) monomer, optionally perfluorinated olefins, are contemporaneously fed with an $O_2$ flow in a liquid reaction mixture formed of a solvent selected from chlorofluorocarbons (CFC), hydrochlorofluorocarbons (HCFC), hydrofluorocarbons (HFC), fluoroethers (FE), hydrofluoroethers (HFE), fluorocarbons (FC) or mixtures thereof. In the case of the copolymerization with hexafluoropropene (HFP) one usually operates in absence of solvent. During the polymerization, the liquid reaction medium is maintained at a temperature in the range $-100°$ and $+50°$ C., preferably $-90°$ and $-30°$ C., and irradiated with ultraviolet radiation having a wave length in the range $2,000–6,000$ A°.

In the latter case the $CF_2=CFOCF_2CF_2SO_2F$ monomer, optionally perfluorinated olefins, in the case of copolymerization, are contemporaneously fed with an $O_2$ flow in a liquid reaction medium formed of a solvent selected from the above mentioned compounds. In the liquid reaction medium, kept at a temperature in the range $-100°$ and $+50°$C., preferably $-90°$ and $-30°$ C., a gaseous or liquid flow of one or more compounds having one or more F–Q bonds wherein Q is selected between fluorine and oxygen, is fed; when Q is oxygen, the initiator is an organic compound containing one or more fluoroxy groups. Commonly the initiator is a $FOR_f$ compound wherein $R_f$ is a perfluoroalkyl radical having from 1 to 3 carbon atoms; or it is a compound of the $FOCF_2OF$, $OF—(RO)_s—F$, $R_f—(RO)_s—F$ type with R perfluoroalkylene radical of the $—CF_2—$, $—CF_2CF_2—$, $—CF_2CF(CF_3)—$ type, wherein s is in the range 1–100. Said initiators are described in U.S. Pat. Nos. 5,142,842, 5,258,110, 5,488,181. The initiator flow-rate is adjusted so that the molar ratio between the initiator and the monomers in the reaction medium is in the range 0.0001–0.1.

In the mixed process it is used the process of the latter case in the presence of UV radiations.

In the processes of the invention oxygen is fed into the reactor, the partial oxygen pressure is generally in the range $0.01–15$ atmospheres; the concentration of the $CF_2=CFOCF_2CF_2SO_2F$ monomer is generally comprised between 0.001 mole/litre and its molar concentration at the pure state. By molar concentration at the pure state, it is meant that the polymerization can be carried in the presence of the sulphonic monomer at the liquid state, or the maximum concentration of said monomer in the above mentioned used solvent. The man skilled in the art is easily able to determine said maximum concentration.

The reaction can be carried out in batch or in a continuous way, continuously drawing from the reactor an aliquot of the liquid phase, subjecting it to distillation, recycling the solvent, if any, and the unreacted monomers and recovering the reaction product.

In the case of copolymers, the frequency of the sulphonylfluoride group $—CF(OCF_2CF_2SO_2F)—$ in the chain is proportional to the perfluoroalkylsulphonyl-vinylether/(olefins++optional comonomers) ratio in the reaction mixture and it can range from 1 to 99% of the total units of the perfluoropolyether.

From the above mentioned polymerization techniques perfluoropolyethers containing in the chain peroxidic groups, are obtained.

The peroxidic bond scission brings to the formation of functionalized end groups, making available perfluoropolyether structures having mono and bifunctional end groups of the $—COR$ (R=F, $—OH$, $—OCH_3$, $—OC_2H_5$, $—OC_3H_7$) type, or of the $—OCF_2Y$ (Y=Br,I) type and containing along the backbone pendent sulphonic groups. This is a further advantage of the products of the invention, since polycondensation polymers can be prepared by using the above mentioned end groups. Said scission processes are described in EP 244,839 and EP 939,700 in the name of the Applicant, herein incorporated by reference, wherein the obtainment of the functional products is also indicated.

To obtain non peroxidic products without chain scission, the peroxidic perfluoropolyethers are subjected to a thermal treatment at temperatures generally in the range $150°$ C. and $250°$ C., or to a photochemical treatment at temperatures generally in the range $-40°$ C. and $+150°$ C. in the presence of UV radiations having a wave length in the range $2,000–6,000$ A° and in the presence of an optional solvent. By fluorination of the so obtained products, products having formula (III) wherein h=0 and the T end groups are $CF_2X$ or $C_3F_7$ as above mentioned, are obtained.

The obtained products can be subjected to conversion in ionic form of the pendent fluorosulphonic groups $—OCF_2CF_2SO_2F$. The conversion requires alkaline hydrolysis to obtain the $—OCF_2CF_2SO_3M$ wherein M is selected from Na, K, $NR_4$ (R=H, $CH_3$, $C_2H_5$), and optional subsequent acid hydrolysis to obtain the $—OCF_2CF_2SO_3H$. Preferably this conversion treatment is carried out on the products of the invention not containing peroxidic oxygen; said conversion in ionic form is described in U.S. Pat. No. 4,940,525.

The perfluoropolyethers of the invention are therefore transformable in the $—OCF_2CF_2SO_3H$ form and they result to have an high thermal stability (higher than $350°$ C.) and a high acidity wherefore they can be used in very aggressive environments in the ionic conductivity field and in the ion exchange and as "superacids" in the catalysis field.

The solid polymers with main chain C—C and pending groups $—OCF_2CF_2SO_2F$ and derivatives, are poorly soluble in apolar solvents. On the contrary the functional perfluoropolyethers of the invention are characterized by the absence of crystallinity and lower glass transition, as well as by high solubility in apolar solvents and in aqueous medium.

It is to be noticed that by carrying out the oxidative polymerization on the pure functional monomer, perfluoropolyethers having a very high concentration of functional sulphonic groups, unobtainable with any other synthesis method known so far, are obtained.

Due to their high chemical inertia, the products of the invention can also have other uses as catalysts or catalyst supports containing as catalytically active part particular functional groups or metal cations fixed by ionic exchange.

Another use of the perfluoropolyethers of the invention is the use as surface modifiers for polymeric and inorganic materials.

The present invention will be better illustrated by the following Examples, which have a merely indicative purpose but not limitative of the scope of the invention itself.

EXAMPLES

Example 1

In a cylindrical glass reactor (250 ml volume and 1 cm optical path) equipped with an internal quartz coaxial sheath and besides with a bubbling pipe for the gas feeding, with a sheath with thermocouple for determining the internal temperature and with a condenser under reflux maintained at the temperature of −80° C., 449 g of $C_3F_6$ are introduced at the temperature of −60° C. Through the bubbling pipe 20 l/h of $O_2$ are bubbled in the reactor. By a refrigerating bath placed outside the reactor the temperature of the reacting liquid phase is maintained at −60° C. for the duration of the test. After a UV ray lamp of the HANAU TQ 150 type (which emits 47 watt of UV radiation having a wave length in the range 2,000–3,000 A°) has been introduced in the quartz sheath, it is switched on and 20.5 mmoles/h of $CF_2$=$CFOCF_2CF_2SO_2F$, diluted with nitrogen (17 l/h), are continuously fed.

Irradiation and feeding of the reacting gases are continued for 91 minutes. The UV lamp heat is controlled by a closed cycle cooling system. After 91 minutes of irradiation the lamp is switched off, one degasses and the unreacted $C_3F_6$ is recovered from the reactor by evaporation at room temperature. 23.5 g of a colourless oily polymer residue are thus obtained. Such product has (iodometric titration) an active (peroxidic) oxygen content equal to 0.36% by weight and by $^{19}$F NMR analysis it results formed of polyether chains of the type:

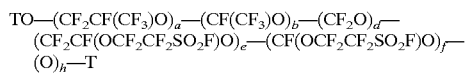

wherein T=—$CF_3$ and —COF in ratio 1:1; a=31.5; b=3.6; d=1.4; e=1.8; f=0.5; h=1.2.

A content of active (peroxidic) oxygen equal to 0.30% and an average molecular weight of 6,600 are then calculated. The polymer results to contain on average 2,3 sulphonic functions for each chain. The yield of the $CF_2$=$CFOCF_2CF_2SO_2F$ monomer in the polymer is 26%.

Example 2

A second test is carried out in the same reactor and under the same conditions of Example 1 but with a flow-rate of the $CF_2$=$CFOCF_2CF_2SO_2F$ monomer of 32 mmoles/h and for a period of time of 134 minutes.

In this case 75 g of polymer are obtained which by $^{19}$F NMR analysis results formed of polyether chains of the type:

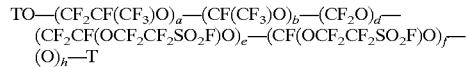

wherein T=—$CF_3$ and —COF in 1:1 ratio; a=24.7; b=2.8; d=1.1; e=2.4; f=2.6; h=0.6. A content of active (peroxidic) oxygen equal to 0.17% and an average molecular weight of 5,500 are then calculated. The polymer results to contain on average 3.0 sulphonic functions for each chain. The yield of the $CF_2$=$CFOCF_2CF_2SO_2F$ monomer in the polymer is 57%.

Example 3

In a 50 ml glass flask equipped with stirrer, thermometer, water-cooled reflux condenser, 29.5 g of the product obtained in Example 2, are introduced. The temperature is brought to 230° C. for 3 h, then brought to 250° C. for additional 3 h. At the end of the test 24.8 g of product are recovered, which by $^{19}$F NMR analysis results formed of polyether chains of the type:

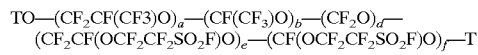

wherein T=—$CF_3$, —COF, —CF($CF_3$)COF, —$CF_2$COF, —$CF_2$COCF_3$ in 1:1 ratio between the —$CF_3$ end group and the functional end groups; a=23.6; b=3.8; d=1.1; e=2.1; f=0.5.

An average molecular weight of 5,300 is then calculated. The iodometric analysis confirms that the active (peroxidic) oxygen content is zero. The polymer results to contain on average 2,6 sulphonic functions for each chain.

Example 4

In a cylindrical glass reactor (70 ml volume and 0.3 cm optical path) equipped with an internal quartz coaxial sheath and besides with a bubbling pipe for the gas feeding, with a sheath with thermocouple for determining the internal temperature and with a condenser under reflux maintained at the temperature of −80° C., 130 g of $CF_2Cl_2$ are introduced at the temperature of −60° C. By the bubbling pipe 7 l/h of $O_2$ and 2 l/h of $C_2F_4$ are bubbled in the reactor. By a refrigerating bath placed outside the reactor the temperature of the reacting liquid phase is maintained at −60° C. for the duration of the test. After a UV ray lamp of the HANAU TQ 150 type (which emits 47 watt of UV radiation having a wave length in the range 2,000–3,000 A°) has been introduced in the quartz sheath, it is switched on and 12.6 mmoles/h of $CF_2$=CFO—$CF_2CF_2SO_2F$, diluted with nitrogen (4 l/h), are continuously fed.

Irradiation and feeding of the reacting gases are continued for 187 minutes. The UV lamp heat is controlled by a closed cycle cooling system. After 187 minutes of irradiation the lamp is switched off and the $CF_2Cl_2$ is recovered by evaporation at room temperature. 27 g of a colourless oily polymer residue are obtained. Such product has (iodometric titration) an active (peroxidic) oxygen content equal to 1.44% by weight and by $^{19}$F NMR analysis it results formed of polyether chains of the type:

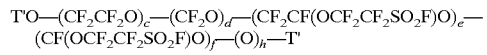

wherein T'=—$CF_2Cl$ and —COF in a 1:1 ratio; c=40; d=31; e=2.9; f=3.6; h=6.5. A content of active (peroxidic) oxygen equal to 1.2% and an average molecular weight of 8,700 are then calculated. The polymer results to contain on average 6.5 sulphonic functions for each chain. The yield of the $CF_2=CFOCF_2CF_2SO_2F$ monomer in the polymer is 51%.

Example 5

In a cylindrical glass reactor (250 ml volume and 1 cm optical path) equipped with an internal quartz coaxial sheath and besides with a bubbling pipe for the gas feeding, with a sheath with thermocouple for determining the internal temperature and with a condenser under reflux maintained at the temperature of −80° C., 450 g of $CF_2Cl_2$ are introduced at the temperature of −60° C. By the bubbling pipe 14 l/h of $O_2$ and 6 l/h of $C_2F_4$ are bubbled in the reactor. By a refrigerating bath placed outside the reactor the temperature of the reacting liquid phase is maintained at −60° C. for the duration of the test. After a UV ray lamp of the HANAU TQ 150 type (which emits 47 watt of UV radiation having a wave length in the range 2000–3,000 A°) has been introduced in the quartz sheath, it is switched on and 39.3 mmoles/h of $CF_2=CFO-CF_2CF_2SO_2F$, diluted with nitrogen (12 l/h), are continuously fed.

Irradiation and feeding of the reacting gases are continued for 420 minutes. The UV lamp heat is controlled by a closed cycle cooling system. After 420 minutes of irradiation the lamp is switched off and the $CF_2Cl_2$ is recovered by evaporation at room temperature. 187.5 g of a colourless oily polymer residue are obtained. Such product has (iodometric titration) an active (peroxidic) oxygen content equal to 0.97% by weight and by $^{19}F$ NMR analysis it results formed of polyether chains of the type:

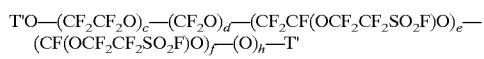

wherein T'=—$CF_2Cl$, —COF; c=74.6; d=88.2; e=4.7; f=7.0; h=8.2.

A content of active (peroxidic) oxygen equal to 0.74% and an average molecular weight of 17,800 are then calculated. The polymer results to contain on average 11.6 sulphonic functions for each chain. The yield of the $CF_2=CFOCF_2CF_2SO_2F$ monomer in the polymer is 44.0%.

Example 6

In a 100 ml glass reactor equipped with stirrer, thermometer and condenser, 17.4 g of the product obtained in Example 5 are introduced. The temperature is brought to 230° C. in 60 minutes and under these conditions by means of a dropping funnel further 96.6 g of product are added in 2 hours. The reactor is maintained at the temperature of 230° C. for additional 4 hours. 91.8 g of product (yield by weight of 80.5%) which has (iodometric titration) an active oxygen content equal to zero and by $^{19}F$ NMR analysis results formed of polyether chains of the type

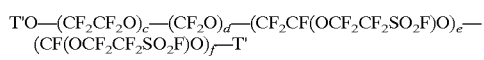

wherein T'=—$CF_2Cl$ (26%), —$CF_3$(14%), —$CF_2COF$ (26%); —COF (34%); c=23.1; d=30.8; e=1.5; f=2.2. An average molecular weight of 6,200 is then calculated. The polymer results to contain on average 3.7 sulphonic functions for each chain. The Tg glass transition temperature (midpoint) of the polymer determined by differential scanning calorimetry (DSC) is −119.9° C. The product subjected to thermogravimetric analysis both in nitrogen and in air, has a loss of 50% respectively at the temperature of 409° C. and 395° C.

Example 7

In a cylindrical glass reactor (250 ml volume and 1 cm optical path) equipped with an internal quartz coaxial sheath and besides with a bubbling pipe for the gas feeding, with a sheath with thermocouple for determining the internal temperature and with a reflux condenser maintained at the temperature of −80° C., 200 g of $CF_2=CFOCF_2CF_2SO_2F$ and 250 g of $CF_2Cl_2$ are introduced at the temperature of −60° C. By the bubbling pipe 14 l/h of $O_2$ are bubbled in the reactor. By a refrigerating bath placed outside the reactor the temperature of the reacting liquid phase is maintained at −60° C. for the duration of the test.

After a UV ray lamp of the HANAU TQ 150 type (which emits 47 watt of UV radiation having a wave length in the range 2,000–3,000 A°) has been introduced in the quartz sheath, it is switched on and irradiation and feeding of the oxygen are continued for 360 minutes. The UV lamp heat is controlled by a closed cycle cooling system. After 360 minutes of irradiation the lamp is switched off and the $CF_2Cl_2$ is recovered by evaporation at room temperature. 207.5 g of a colourless oily residue is obtained. Such product has (iodometric titration) an active (peroxidic) oxygen content equal to 0.3% by weight. The so obtained product is placed in a reactor equipped with a stirrer at the temperature of 100° C. under nitrogen flow, recovering in a trap cooled at −80° C. the distillable products. 94.2 g of product remain in the reactor. It has (iodometric titration) an active oxygen content equal to 0.25% by weight and by $^{19}F$ NMR analysis it results formed by polyether chains of the type:

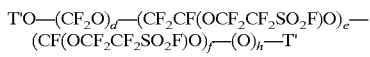

wherein T'=—$CF_2Cl$ (25%), —$CF_3$(33.5), —$CF_2COF$ (15.5%); —COF (26%); d=31.3; e=16.3; f=13.7; h=1.5. The average molecular weight is of 10,400, the viscosity is 595 cSt and the polymer contains on average 30 sulphonic functions for each chain. The yield of the $CF_2=CFOCF_2CF_2SO_2F$ monomer in the polymer is 38%.

Example 8

In a 100 ml glass reactor equipped with stirrer, thermometer and condenser, 63.2 g of polymer product obtained in Example 7 are introduced. The temperature is brought to 230° C. in 52 minutes; the reactor is maintained at the temperature of 230° C. for additional 2 hours. 55.6 g of product (yield by weight of 88%) are recovered at the end of the reaction, which has (iodometric titration) an active oxygen content equal to zero and by $^{19}F$ NMR analysis is formed of polyether chains of the type

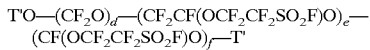

wherein T'=—$CF_2Cl$ (7.5%), —$CF_3$(10.5%), —$CF_2COF$ (30%); —COF (52%); d=12.4; e=6.3; f=7.0.

An average molecular weight of 4,600 is then calculated. The polymer results to contain on average 13.3 sulphonic functions for each chain. The Tg glass transition temperature of the polymer, determined by DSC, is −93.4° C. The product subjected to thermogravimetric analysis both in nitrogen and in air, has in both cases a loss of 10% at the temperature of 347° C. and a loss of 50% at the temperature of 393° C.

Example 9

In a cylindrical glass reactor (500 ml volume and 1.2 cm optical path) equipped with an internal quartz coaxial sheath and besides with a bubbling pipe for the gas feeding, with a sheath with thermocouple for determining the internal temperature and with a condenser under reflux maintained at the temperature of −80° C., 500.1 g of $CF_2=CFOCF_2CF_2SO_2F$ and 479 g of hexafluoropropylene $C_3F_6$ are introduced at the temperature of −60° C. By the bubbling pipe 14 l/h of $O_2$ are bubbled in the reactor. By a refrigerating bath placed outside the reactor the temperature of the reacting liquid phase is maintained at −60° C for the duration of the test.

After a UV ray lamp of the HANAU TQ 150 type (which emits 47 watt of UV radiation having a wave length in the range 2,000–3,000 A°) has been introduced in the quartz sheath, it is switched on and irradiation and feeding of the oxygen are continued for 8 hours. The UV lamp heat is controlled by a closed cycle cooling system. After 8 hours of irradiation the lamp is switched off and the unreacted $C_3F_6$ and in case other volatile products are recovered by evaporation at room temperature. 574.6 g of a colourless reaction product are obtained. Such product has (iodometric titration) an active (peroxidic) oxygen content equal to 0.54% by weight.

The $^{19}F$ NMR analysis shows the total disappearance of the $CF_2=CFOCF_2CF_2SO_2F$ monomer.

By using the same reactor, 294 g of inert solvent Galden HT55 are added to the product and by maintaining the temperature at −20° C. the reactor is fed with 12 l/h of nitrogen: under these conditions the lamp is switched on and the reaction mixture is irradiated for 8 hours. From the reactor 809.1 g of reaction mixture are recovered which result to have an active oxygen content (iodometric titration) equal to 0.049% by weight.

In a 1000 ml glass reactor equipped with stirrer, thermometer and condenser, 776 g of the previous mixture containing the photoreduced product are introduced. The reactor temperature is brought to 230° C. in 52 minutes and maintained at said value for 2 hours with complete distillation of the solvent and of the light products. 293 g of polymer product are recovered from the reactor at the end of the treatment. It has an active oxygen content (iodometric titration) equal to zero and by $^{19}F$ NMR analysis it results formed of polyether chains of the type T'O—(CF$_2$CF(CF$_3$)O)$_a$—(CF(CF$_3$)O)$_b$—(CF$_2$O)$_d$—
(CF$_2$CF(OCF$_2$CF$_2$SO$_2$F)O)$_e$—(CF(OCF$_2$CF$_2$SO$_2$F)O)$_f$—T' wherein T'=—CF$_3$, —COF, —CF(CF$_3$)COF, —CF$_2$COF, —CF$_2$COCF$_3$ in a 1:1 ratio between the —CF$_3$ end group and the functional end groups; a=5.3; b=0.5; d=2.7; e=5.6; f=2.4.

An average molecular weight of 3,500 is then calculated. The polymer viscosity results of 452 cSt at 20° C. and the polymer results to contain on average 8 sulphonic functions for each chain. The product subjected to thermogravimetric analysis in nitrogen has a loss of 50% at the temperature of 367° C.

Example 10

Distillation 241 g of the product obtained in Example 9 are distilled at the pressure of 2*10$^{-1}$ mbar reaching a maximum temperature in the boiler of 250° C. 92.1 g of distilled polymer which results to have a viscosity of 90.2 cSt at 20° C. are obtained. The product structure determined by NMR $^{19}F$ analysis results:

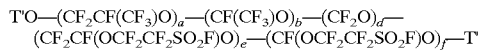

wherein T'=—CF$_3$, —COF, —CF(CF$_3$)COF, —CF$_2$COF, —CF$_2$COCF$_3$ in a 1:1 ratio between the —CF$_3$ end group and the functional end groups; a=2.5; b=0.2; d=1.1; e=2.4; f=1.8. An average molecular weight of 1,800 is then calculated, the polymer results to contain on average 4.2 sulphonic functions for each chain with an equivalent weight of 346.

The residue recovered in the boiler, 137.4 g results to have a viscosity of 2,856 cSt at 20° C. The structure of the product determined by NMR $^{19}F$ analysis results:

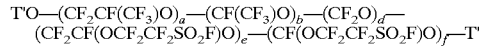

wherein T'=—CF$_3$, —COF, —CF(CF$_3$)COF, —CF$_2$COF, —CF$_2$COCF$_3$ in a 1:1 ratio between the —CF$_3$ end group and the functional end groups; a=14.6; b=1.4; d=6.85; e=13.1; f=6.1. An average molecular weight of 8,600 is then calculated, the polymer results to contain on average 19.2 sulphonic functions for each chain with an equivalent weight of 426.

Salification/acidification a) Distilled fraction: 90.3 g of product having viscosity 90,2 cSt are treated with 225 g of KOH (solution at 20%) at the temperature of 98° C. for 3 hours under stirring. After cooling, 225 g of HCl (solution at 37%) are slowly added and the temperature is maintained at 102° C. for 2 hours. The solution is let cool and decant, the upper liquid solution is separated and the resulting solid product is washed with HCl at 37% two times (210 g for washing and 4 hours under stirring) at the temperature of 75° C. and a further washing with HCl at 20% (200 g for 1 hour) at the temperature of 70° C.

After cooling the solid product is separated by decantation and dried by rotavapor (95° C. under vacuum of water pump). 44 g of product are recovered and 100 mg of it are dissolved in 44 ml of water, 5 ml of NaOH N/10 are added and it is left under stirring for 30 minutes. The excess of soda is titrated with $H_2SO_4$ N/10. An equivalent weight of 450 is thus calculated.

The product subjected to thermogravimetric analysis in nitrogen has a loss of 10% by weight at the temperature of 300° C. and of 50% at 372° C.

b) Residue: 104.1 g of product having viscosity 2,856 cSt is treated with 208 g of KOH (solution at 20%) at the temperature of 98° C. for 3 hours under stirring. After cooling, 208 g of HCl (solution at 37%) are slowly added and the temperature is maintained at 100° C. for 3 hours. The solution is let cool and decant, the upper liquid solution is separated and the resulting solid product is washed with HCl at 37% two times (208 g for washing and 4 hours under stirring) at the temperature of 80° C. then three additional washings with HCl at 20% (200 g for washing and 1 hour under stirring) are carried out at the temperature of 95° C.

After cooling the solid product is separated by decantation and dried by rotavapor (95° C. under vacuum of water pump). 66.9 g of product are recovered and 100 mg of it are dissolved in 40 ml of water, 5 ml of NaOH N/10 are added and it is left under stirring for 30 minutes. The excess of soda is titrated with $H_2SO_4$ N/10. An equivalent weight of 490 is thus calculated.

The product subjected to thermogravimetric analysis in nitrogen has a loss of 10% by weight at the temperature of 302° C. and of 50% at 366° C.

Examples 11–13

By using the equipment of Example 1 and operating likewise, a series of tests has been carried out changing the flow-rate of the $CF_2=CFOCF_2CF_2SO_2F$ monomer.

The obtained products, evaluated by $^{19}F$ NMR spectroscopy resulted characterized by the same structural units and by the same end groups observed in the material obtained in Example 1 in a different ratio among each other.

In Tables 1 and 2 the used operating procedures and the properties of the obtained products are summarized.

As it can be noticed from the data in Tables 1 and 2, the obtained products have a comparable molecular weight and the Tg can be lowered by increasing the molar percentage of sulphonic units present in the chain, whose content increases as the flow-rate of the $CF_2$=$CFOCF_2CF_2SO_2F$ monomer increases. The sum of the —$CF_2CF(CF_3)O$— units with the —$CF_2CF(OCF_2CF_2$—$SO_2F)O$— unit substantially remains constant wherefore the Tg decrease is not due to the variation of the ratio of these two units but to the increase of the —$CF(OCF_2CF_2SO_2F)O$— and —$CF_2O$— units, while the —$CF(CF_3)O$— unit substantially remains constant.

As it can be seen, the sum of the —$CF_2O$— and —$CF(OCF_2CF_2$—$SO_2F)O$— units ranges from about 4% to about 10% by mole and this causes a decrease of about 10° C. of the Tg, the molecular weight being equal. This makes available lubricants which have a lower Tg with the same molecular weight, even maintaining an high thermooxidative stability both in air and in nitrogen.

This result is completely unexpected and without binding to any theory, it seems due to the influence of the greater presence of the —$CF_2O$— and —$CF(OCF_2CF_2SO_2F)O$— units, caused by the increase of the flow-rate of the fed $CF_2$=$CFOCF_2CF_2SO_2F$ monomer.

This effect on the —$CF_2O$— unit does not take place in FOMBLIN® Y; in fact even increasing the concentration of the —$CF_2CF(CF_3)O$— unit to increase the molecular weight, Fomblin® Y maintains substantially unchanged the —$CF_2O$— and —$CF(CF_3)O$— units.

This datum explains as FOMBLIN® Y, the molecular weight being equal, has Tg values similar to those of KRYTOX® even though the —$CF_2O$— unit is not present, being formed only of the —$CF(CF_3)CF_2O$— unit.

The results of the invention shown in Table 2 are therefore not obtainable with the KRYTOX®type monomer, since there is no formation of the —$CF_2O$— unit even polymerizing in the presence of epoxides containing fluorosulphonic groups.

It results therefore surprising the effect of the increase of the flow-rate of the sulphonic monomer which allows to change the Tg, the molecular weight being equal, as a consequence of the higher presence of the —$CF_2O$— and —$CF(OCF_2CF_2SO_2F)O$— units.

Example 14

10 g of sulphonic PFPE obtained according to the procedures of Example 11 are previously treated under vacuum at 245° C. for 6 hours to remove the peroxidic groups; 9 grams of the so obtained product are mixed with 0.9 g of MgO and 0.9 g of hexamethylendiamine. During mixing the mass thickens and losses fluidity. By bringing the temperature to 100° C. the mixture becomes fluid again. When the complete mixing of the product is obtained the mass is heated under vacuum up to 245° C. and left at such temperature for about 30 minutes. 9.7 g of product are obtained which appears solid at room temperature. The IR analysis confirms the complete conversion to sulphonamide. The DSC analysis shows a Tg of −56.3° C.; the thermogravimetric analysis shows the loss of 2% by weight at 239° C. and of 50% at 422° C.

The polymer obtained after filtration of the magnesium oxide from the dispersion in PFPE (Galden) results soluble in the same. The product softens instead in A113, HPFPE (H-Galden), acetone, methanol and water. Such behaviour remains unchanged after about 2 months.

Example 15

10 g of sulphonic PFPE obtained according to the procedures of Example 13 are previously treated under vacuum at 245° C. for 6 hours to remove the peroxidic groups; 8.2 grams of the so obtained product are mixed with 0.82 g of MgO and 0.84 g of hexamethylendiamine. During mixing the mass thickens and losses fluidity. By bringing the temperature to 150° C. the mixture becomes fluid again. When the complete mixing of the product is obtained the mass is heated under vacuum up to 200° C., temperature at which fluidity is lost. Heating is continued up to 245° C. and this temperature is maintained for about 30 minutes. 9.3 g of rubbery solid product are obtained.

The IR analysis confirms the complete conversion to sulphonamide. The DSC analysis shows a Tg of −41.5° C.; the thermogravimetric analysis shows the loss of 2% by weight at 305° C. and of 50% at 421° C.

The polymer obtained subjected to compatibility tests with different solvents (A113, Galden, HPFPE (H-Galden), acetone, methanol) tends to swell with partial softening. With water, viceversa, no change even after two months occurs.

TABLE 1

| | Flow-rate $CF_2$=$CFOCF_2CF_2SO_2F$ monomer (mmoles/h) | Obtained product (grams) | Average molecular weight | Oxygen percentage (g O/100 g) |
|---|---|---|---|---|
| Example 11 | 17.6 | 123.8 | 4,600 | 0.21 |
| Example 12 | 35 | 109.5 | 4,550 | 0.14 |
| Example 13 | 52.7 | 109.4 | 4,050 | 0.26 |

TABLE 2

| | Content of $CF_2CFO\,|\,CF_3$ (% by mole) | Content of $CFO\,|\,CF_3$ (% by mole) | Content of $CF_2O$ (% by mole) | Content of $CF_2CFO\,|\,OCF_2CF_2SO_2F$ (% by mole) | Content of $CFO\,|\,OCF_2CF_2SO_2F$ (% by mole) | Tg (° C.) |
|---|---|---|---|---|---|---|
| Example 11 | 70.8 | 11.3 | 3.1 | 3.2 | 0.8 | −65 |
| Example 12 | 64.5 | 10.7 | 5.2 | 6.7 | 1.7 | −67.1 |
| Example 13 | 57 | 9.5 | 7 | 12 | 3.3 | −74.8 |

What is claimed is:

1. Perfluoropolyether lubricants containing sequences of oxyperfluoroalkylene units, characterized by the presence of sulphonylfluoride groups pending along the perfluoropolyether chain and having the following formula:

$$TO—(CF_2CFO)_{\overline{a}}—(CFO)_{\overline{b}}—(CF_2CF_2O)_{\overline{c}}—(CF_2O)_d—$$
$$\phantom{TO—(}|\phantom{CF_2CFO)_{\overline{a}}—}|$$
$$\phantom{TO—(}CF_3\phantom{CF)_{\overline{a}}}CF_3$$

$$—(CF_2CFO)_{\overline{e}}—(CFO)_f—(O)_{\overline{h}}—T$$
$$\phantom{—(CF}|\phantom{CFO)_{\overline{e}}—}|$$
$$\phantom{—(CF}O\phantom{CFO)_{\overline{e}}—}O$$
$$\phantom{—(CF}|\phantom{CFO)_{\overline{e}}—}|$$
$$\phantom{—(CF}CF_2\phantom{FO)_{\overline{e}}}CF_2$$
$$\phantom{—(CF}|\phantom{CFO)_{\overline{e}}—}|$$
$$\phantom{—(CF}CF_2\phantom{FO)_{\overline{e}}}CF_2$$
$$\phantom{—(CF}|\phantom{CFO)_{\overline{e}}—}|$$
$$\phantom{—(CF}SO_2F\phantom{O)_e}SO_2F$$

wherein:
T are end groups selected from —$CF_2X$ ($X=F,CF_3,Cl$), —$C_3F_7$, —COF, —$CF(CF_3)COF$, —$CF_2COF$, —$CF_2COCF_3$;
d,e,f,h are integers; a,b,c can be zero or integers; said units are statistically distributed along the chain being a+b+c+d+e+f+h such that the number average molecular weight ranges from 500 to $5\times10^5$.

2. Perfluoropolyether lubricants according to claim 1, wherein the comonomers of perfluoro 3-oxa 5-fluorosulphonyl 1-pentene ($CF_2=CFOCF_2CF_2SO_2F$) are tetrafluoroethylene and/or perfluoropropene.

3. Perfluoropolyether lubricants according to claim 1, wherein other comonomers are present selected from: perfluoroalkylvinylethers $CF_2=CF_2OR_f$, wherein $R_f$ is a perfluoroalkyl group —$CF_3$, —$C_2F_5$, $C_3F_7$; perfluorinated conjugated dienes.

4. Perfluoropolyether lubricants according to claim 1 having the structure:

$$TO—(CF_2CF_2O)_{\overline{c}}—(CF_2O)_d—(CF_2CFO)_{\overline{e}}—(CFO)_f—(O)_{\overline{h}}—T$$
with pendant O—$CF_2$—$CF_2$—$SO_2F$ groups wherein:
T are end groups selected from —$CF_2X$ ($X=F,CF_3,Cl$), —COF, —$CF_2COF$;
c,d,e,f,h have the above defined meaning with the proviso that c cannot be equal to 0.

5. Perfluoropolyether lubricants according to claim 1 having the structure:

$$TO—(CF_2CFO)_{\overline{a}}—(CFO)_{\overline{b}}—(CF_2O)_d—(CF_2CFO)_{\overline{e}}—(CFO)_f—(O)_{\overline{h}}—T$$
with $CF_3$, $CF_3$ pendant groups and O—$CF_2$—$CF_2$—$SO_2F$ pendant groups wherein:
T are end groups selected from —$CF_2X$ ($X=F,CF_3$), —$C_3F_7$, —COF, —$CF_2COF$, —$CF(CF_3)COF$, —$CF_2COCF_3$;
a,b,d,e,f,h have the above defined meaning with the proviso that a,b cannot be 0.

6. Perfluoropolyether lubricants according to claim 1 having the structure:

$$TO—(CF_2O)_d—(CF_2CFO)_{\overline{e}}—(CFO)_f—(O)_{\overline{h}}—T$$
with pendant O—$CF_2$—$CF_2$—$SO_2F$ groups wherein:
T are end groups selected from —$CF_2X$ ($X=F,CF_3,Cl$), —COF, —$CF_2COF$, —$CF_2CF_2SO_2F$;
d,e,f,h have the above defined meaning.

7. A process for obtaining the perfluoropolyether lubricants of claim 1 comprising feeding of the monomers and of an $O_2$ flow in a liquid reaction mixture formed of a solvent selected from chlorofluorocarbons (CFC), hydrochlorofluorocarbons (HCFC), hydrofluorocarbons (HFC), fluoroethers (FE), hydrofluoroethers (HFE), fluorocarbons (FC) or mixtures thereof;
during the polymerization the liquid reaction medium is maintained at a temperature in the range $-100°$ and $+50°$ C., and irradiated with ultraviolet radiation having a wave length in the range 2,000–6,000 A°.

8. A process for obtaining the perfluoropolyether lubricants of claim 1 comprising feeding of the monomers and of an $O_2$ flow in a liquid reaction medium formed of a solvent selected from the compounds of claim 7;
in the liquid reaction medium, kept at a temperature in the range $-100°$ and $+50°$ C., a gaseous or liquid flow of one or more compounds is fed, having formula:
$FOR_f$ wherein $R_f$ is a perfluoroalkyl radical having from 1 to 3 carbon atoms
—$FOCF_2OF$;
$FO—(RO)_s—F$ or $R_f—(RO)_s—F$
wherein R is a perfluoroalkylene radical —$CF_2$—$CF_2CF_2$—, —$CF_2CF(CF_3)$— type, wherein s is in the range 1–100.

9. A process according to claim 8 carried out in the presence of ultraviolet radiation having a wave length in the range 2,000–6,000 A°.

10. A process according to claim 7, wherein the partial pressure of the fed oxygen is in the range 0.01–15 atmospheres and the concentration of the $CF_2=CFOCF_2CF_2SO_2F$ monomer is comprised between 0.001 mole/litre and its molar concentration at the pure state.

11. A process according to claim 7, wherein the peroxidic perfluoropolyethers of claims 1–6 are subjected to a thermal treatment at temperatures in the range. $150°$ C. and $250°$ C., or to a photochemical treatment at temperatures in the range $-40°$ C. and $+150°$ C. in the presence of UV radiations having a wave length in the range 2,000–6,000 A°.

12. A process according to claim 11, wherein the obtained compounds are subjected to a fluorination treatment.

13. A process according to claim 7, wherein the compounds are subjected to conversion in ionic form of the pendent fluorosulphonic groups —$OCF_2CF_2SO_2F$ to obtain the —$OCF_2CF_2SO_3M$ wherein M is selected from Na, K, $NR_4$ ($R=H$, $CH_3$, $C_2H_5$) by alkaline hydrolysis, optionally subsequent acid hydrolysis to obtain the —$OCF_2CF_2SO_3H$.

14. Perfluoropolyether according to claims 1 to 6, wherein h is zero and T is —$CF_2X$ ($X=F,CF_3,Cl$) or —$C_3F_7$.

15. Perfluoropolyether according to claim 14, wherein the pendent fluorosulphonic groups —$OCF_2CF_2SO_2F$ are replaced by —$OCF_2CF_2SO_3M$ wherein M is selected from Na, K, $NR_4$ (R=H,$CH_3$,$C_2H_5$).

16. Perfluoropolyether according to claim 1, wherein the number average molecular weight ranges from 1,000 to 50,000.

17. Perfluoropolyether according to claim 3, wherein the perfluorinated conjugated diene is perfluorobutadiene.

18. A process according to claim 7, wherein during the polymerization the liquid reaction medium is maintained at a temperature in the range −90° and −30° C.

19. A process according to claim 8, wherein the liquid reaction medium is kept at a temperature in the range −90° and −30° C.

\* \* \* \* \*